United States Patent [19]
Engelbrecht et al.

[11] 4,079,411
[45] Mar. 14, 1978

[54] DIFFRACTIVE PHASE FILTER HAVING NEAR FIELD WAVELENGTH DEPENDENT FOCUSING PROPERTIES

[75] Inventors: Rudolf Succo Engelbrecht, Bremgarten; Karl Knop, Zurich, both of Switzerland

[73] Assignee: RCA Corporation, New York, N.Y.

[21] Appl. No.: 647,405

[22] Filed: Jan. 8, 1976

[30] Foreign Application Priority Data

Jul. 1, 1975 United Kingdom ............... 27701/75

[51] Int. Cl.² .................... H04N 9/07; H04N 5/84; G02B 5/18; G03B 33/00
[52] U.S. Cl. .......................................... 358/6; 358/44; 358/55; 350/162 R; 594/100
[58] Field of Search ......... 350/167, 169, 170, 162 SF, 350/162 R; 358/6, 44, 45, 55; 352/66; 354/100, 101, 102

[56] References Cited

U.S. PATENT DOCUMENTS

| | | | |
|---|---|---|---|
| 666,424 | 1/1901 | Ives | 354/101 |
| 2,124,139 | 7/1938 | Eggert et al. | 352/66 |
| 2,309,626 | 2/1943 | Conrad | 352/66 |

FOREIGN PATENT DOCUMENTS

| | | | |
|---|---|---|---|
| 418,040 | 1934 | United Kingdom | 354/101 |
| 494,456 | 1938 | United Kingdom | 350/167 |
| 383,795 | 1932 | United Kingdom | 354/101 |

*Primary Examiner*—John C. Martin
*Attorney, Agent, or Firm*—H. Christoffersen; Samuel Cohen; George J. Seligsohn

[57] ABSTRACT

A phase grating structure is defined in which a series of predetermined sawtooth phase delay steps has the property of focusing respective wavelength components of a spectrum of incident wave energy in accordance with their wavelength at different spots in the near field. Although not limited thereto, the invention has particular utility for spatially separating the color components of polychromatic light. Useful applications for this phase filter include (1) recording color pictures on black-and-white film for display in full color, and (2) a single-gun color television camera.

26 Claims, 11 Drawing Figures

ONE-DIMENSIONAL
GRATING

*Fig. 4a*

DARK BANDS

90° CROSSED,
TWO-DIMENSIONAL COMPOSITE
GRATING

*Fig. 4b.*

CIE DIAGRAM
*Fig. 5.*

DIFFRACTIVE PHASE FILTER HAVING NEAR FIELD WAVELENGTH DEPENDENT FOCUSING PROPERTIES

This invention relates to a phase filter for focusing the respective wavelength components of a spectrum of incident wave energy in accordance with their wavelength at different spots in the near field of the filter.

While the principles of the present invention are applicable to any type of wave energy, including both acoustic and electromagnetic wave energy of any given wavelength spectrum, the present invention has particular utility for spatially separating the color components of polychromatic light wave energy.

Prior art color filters, whether of the absorbing type, the phase type, the dispersion type or some combination of these, suffer from one or more of such disadvantages as: (1) low optical efficiency; (2) color instability; (3) expensive to mass-produce or (4) require a filter medium having special properties (e.g. non-absorbing material with strongly wavelength-dependent refractive index to provide dispersion) not readily and inexpensively available. The novel color phase filter of the present invention suffers from none of these disadvantages.

Briefly, in accordance with the teaching of the present invention, a phase diffraction grating structure is provided in which the phase variation follows a series of predetermined sawtooth steps that has the useful property of focusing the different spectral components of a collimated incident wave into a side-by-side pattern in a near-field plane, where they can be spatially resolved. Since none of the incident wave energy need be absorbed or otherwise removed in the process, nearly 100% optical efficiency is feasible. Further, a periodic array of such phase diffraction gratings may be easily produced in the form of a surface relief structure which is embossed on a transparent plastic film to provide a color-recording capability having an information density which may be in the order of one-million picture elements per square centimeter and exhibiting a colorimetry which is superior to conventional color processes.

This and other features and advantages of the present invention will become more apparent from the following detailed description taken together with the accompanying drawing, in which:

Figure 1:
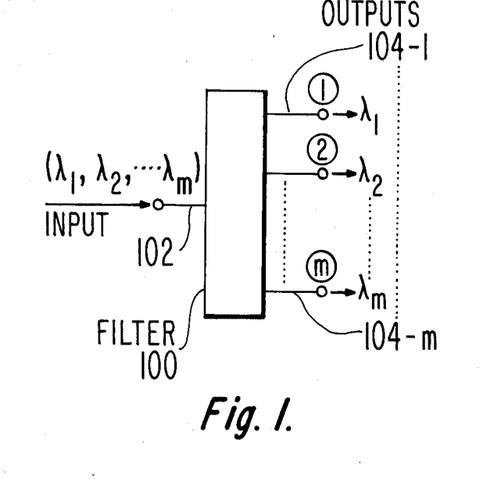
FIGS. 1, 1a and 1b functionally show the type of wave filter with which the present invention is concerned.
Figure 1A:
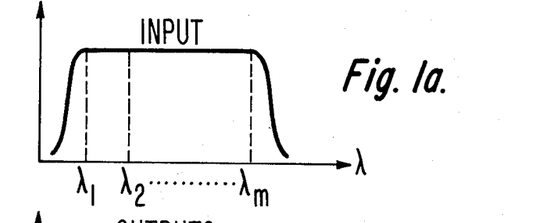
Figure 1B:
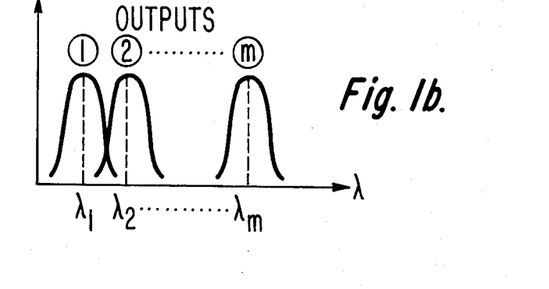

The present invention is concerned with the type of wave filter functionally shown in FIGS. 1, 1a and 1b. Specifically, filter 100 has a single input port 102 and m separate output ports 104-1 . . . 104-m. The input signal to input port 102 is a broad-band spectrum of wave energy, shown in FIG. 1a, which includes components having wavelengths $\lambda_1, \lambda_2 \ldots \lambda_m$. Filter 100 separates the input wave energy in accordance with wavelengths and delivers each respective relatively narrow-band portion of the wave energy centered respectively at $\lambda_1 \ldots \lambda_m$, shown in FIG. 1b, through each corresponding output port 104-1 . . . 104-m.

Figure 2:
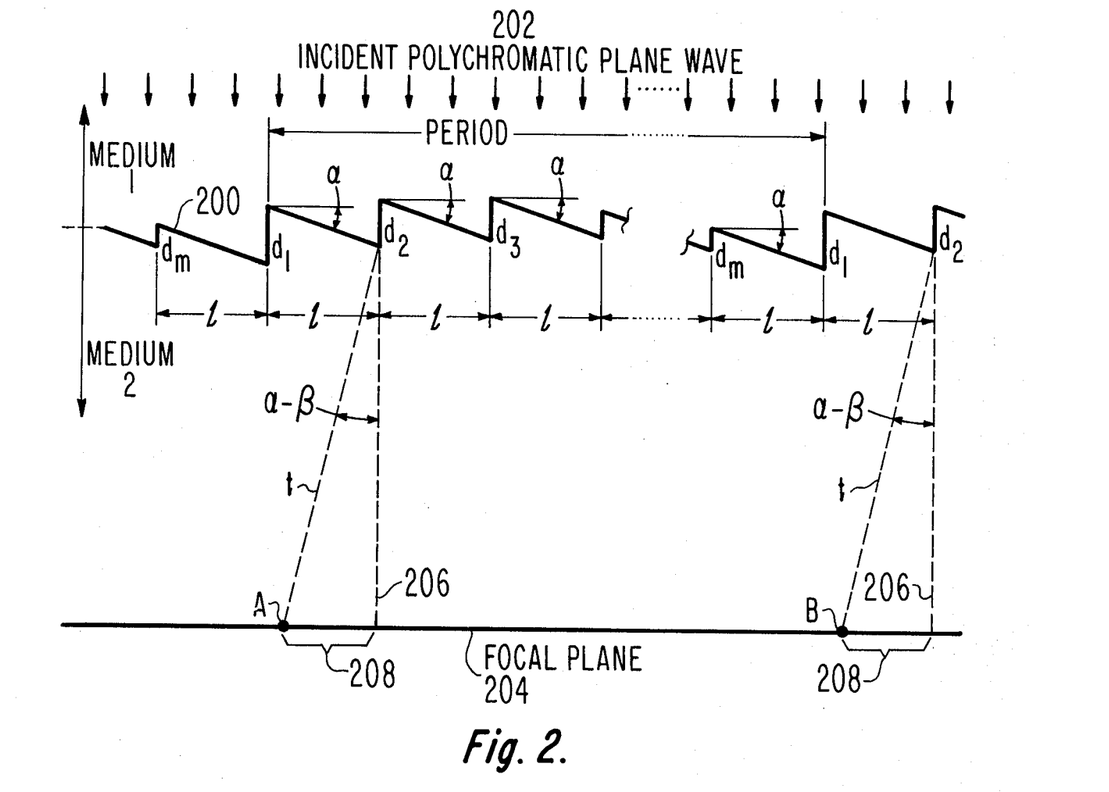
FIGS. 2, 2a and 2b, respectively, illustrate three different types of periodic grating structures embodying the principles of the present invention.
Figure 3:
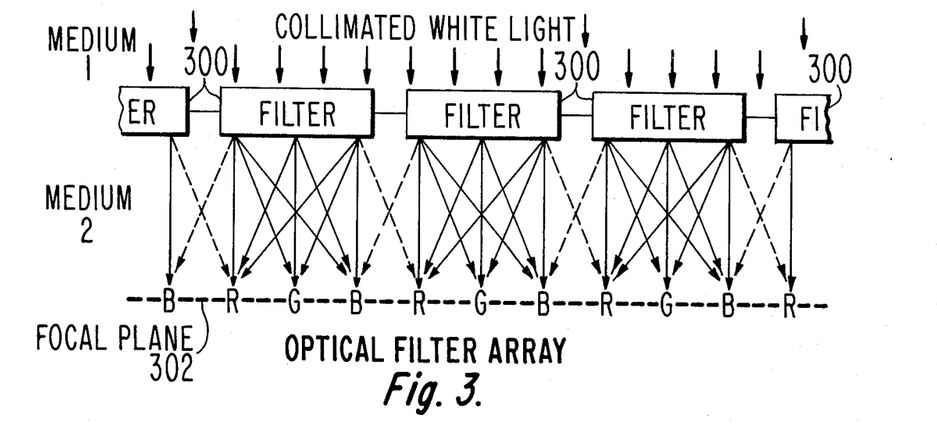
FIG. 3 illustrates an optical filter array incorporating the principles of the present invention.

Structurally, in accordance with the principles of the present invention, each period of the periodic grating structure shown in FIG. 2 constitutes a wave filter of the type functionally shown in FIGS. 1, 1a and 1b. In principle, the input wave energy that is applied to the wave filter shown in FIGS. 1 and 2 includes both acoustic wave energy and electromagnetic wave energy, and the values of wavelengths $\lambda_1 \ldots \lambda_m$ of the wavelength spectrum of the input wave energy may cover a continuous range. As shown in FIG. 3, the present invention is particularly suitable for use as an optical filter array capable of spatially segregating input white light into its color components. In FIG. 3, each of contiguous filters 300 corresponds with a separate period of the periodic grating structure shown in FIG. 2.

Figure 2A:
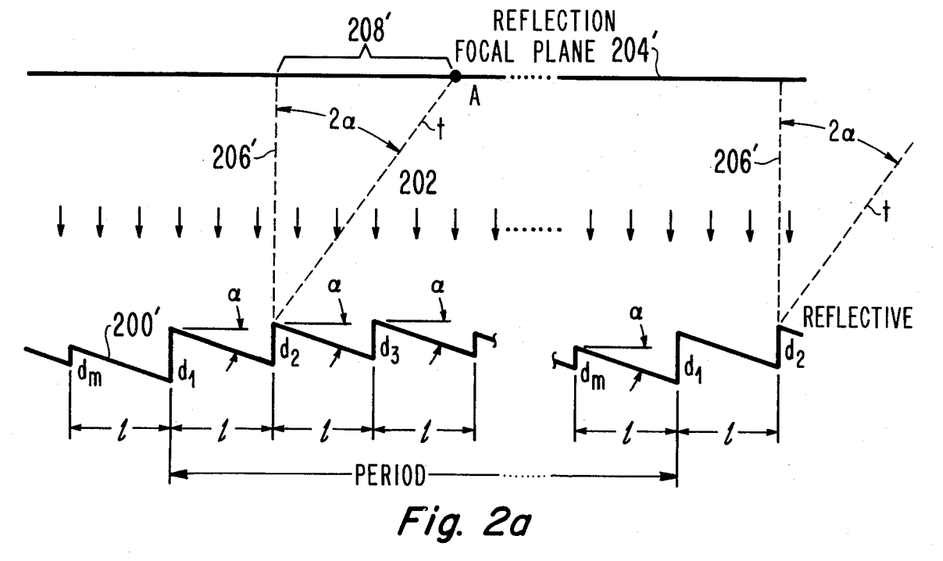
Figure 2B:
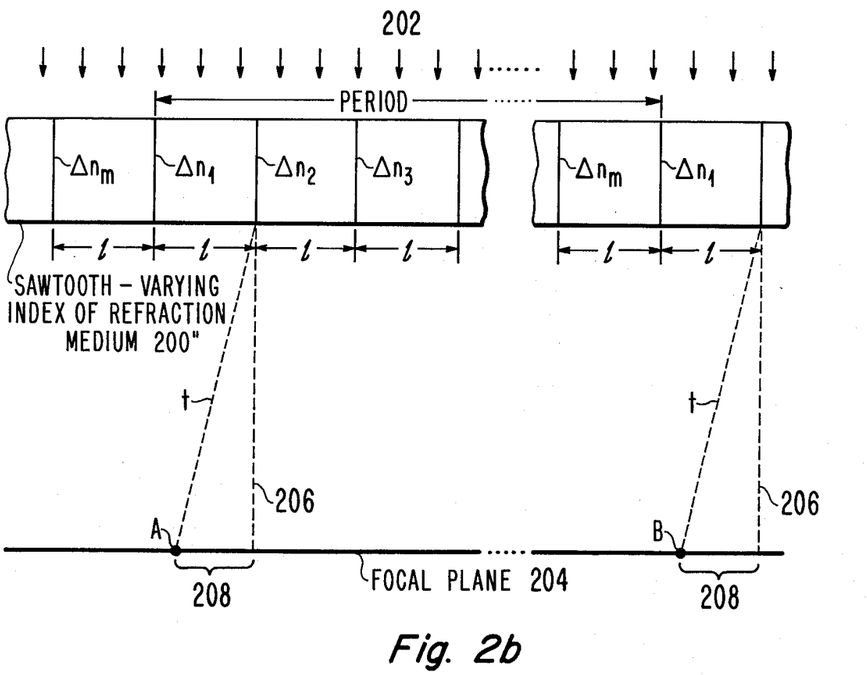

For ease of visualization and as an illustrative example of a useful embodiment of the present invention, the required phase variation of the grating structure is shown in FIG. 2 as having been produced by physical deformation of the interface between two semi-infinite regions of refractive index $n_1$ and $n_2$, respectively, into a relief pattern of sawtooth steps. However, it should be understood that the required phase variation can be produced by other means, obvious to one skilled in the art, without deviating from the scope of the present invention. For example, the required phase variation may be achieved in a layer of constant thickness, located along a physically smooth interface between two semi-infinite regions, by varying the index of refraction in the layer according to a sawtooth function of position along said interface. Such a variable index of refraction embodiment of the present invention is shown in FIG. 2b, described in more detail below.

Also, for ease of visualization, the grating structure depicted in FIG. 2 is shown as a transmission grating. However, it should be understood that the desired spatial segregation of the wavelength components can be achieved by an analogous reflection structure. This analogous reflection structure is shown in FIG. 2a, described below. The required phase variation along said reflection structure is identical to that of the corresponding transmission structure, except for a constant scaling factor which is readily derived by one skilled in the art.

Referring now in more detail to FIG. 2, periodic grating 200 forms a boundary between medium 1, situation above periodic grating 200, and medium 2, situated below grating 200. Medium 1 has a first index of refraction $n_1$, while medium 2 has a second index of refraction $n_2$ greater than $n_1$. Traveling in medium 1 and incident on periodic grating 200 is polychromatic plane wave 202 having a free space wavelength spectrum extending from $\lambda_0 - \Delta\lambda$ to $\lambda_0 + \Delta\lambda$, where $\lambda_0$ is the center wavelength of this wavelength spectrum, and $\Delta\lambda$ is one-half of the spectrums width. In the special case where this wavelength spectrum is the visible light spectrum, medium 1 may be air, having an index of refraction substantially equal to unity, while medium 2 may be an embossable transparent plastic, such as polyvinyl chloride, having an index of refraction of about 1.5.

As shown in FIG. 2, each period of periodic grating 200 is composed of a series of $m$ sawtooth steps. All $m$ of the sawtooth steps have the same width 1 (so that each grating period is equal to $ml$) and are inclined at the same angle $\alpha$ with respect to the horizontal. However, the respective vertical heights $d_1 \ldots d_m$ of the respective $m$ sawtooth steps are different from each other. In particular, the respective values of $d_1 \ldots d_m$ are selected to satisfy the following two equations:

$$\delta = d_1 - d_2 = \ldots d_{m-1} - d_m = \frac{\lambda_0}{m(n_2 - n_1)} \quad (1)$$

$$\frac{d_1 + d_m}{2} = \frac{\lambda_0^2}{2\Delta\lambda(n_2 - n_1)} \quad (2)$$

For the constraints on periodic grating 200 provided by equations (1) and (2), it follows that:

$$\tan \alpha = \frac{1}{ml} \sum_{k=1}^{m} d_k = \frac{\lambda_0^2}{2l\Delta\lambda(n_2 - n_1)} \quad (3)$$

In accordance with the principles of the present invention, periodic grating 200 operates as a phase filter which diffractively focuses each wavelength component of incident polychromatic plane wave 202 at different points lying substantially in focal plane 204, as shown in FIG. 2. The focal distance $t$ (of the central wavelength $\lambda_o$) of point A from its originating point in one period of periodic grating 200 and the focal distance $t$ of point B from its corresponding originating point in another period of periodic grating 200 determines focal plane 204 as a plane parallel to periodic grating 200 which passes through points A and B. Due to refraction, the focal distance $t$ is inclined at angle $(\alpha-\beta)$ with the normal to plane 204 in accordance with the following equation:

$$\frac{\sin \beta}{\sin \alpha} = \frac{n_2}{n_1} \quad (4)$$

Thus, plane 204 is located at a distance $t \cos(\alpha - \beta)$ from periodic grating 200. A further effect of refraction is to move all focal points at all wavelength components of said incident polychromatic plane wave 202 in focal plane 204 to the left by a fixed distance equal to $t \sin(\alpha - \beta)$, as indicated by line segment 208 in FIG. 2. Therefore, the only effect of refraction is to produce constant positional offsets.

In the special case where incident polychromatic plane wave 202 is collimated white light having a spectrum extending from 400 nm (blue light) to 700 nm (red light), the center wavelength $\lambda_0$ is 550 nm (green light) and $\Delta\lambda$ is equal to 150 nm. The array of optical filters 300, shown in FIG. 3 (which are designed in accordance with equations 1-4) diffractively focus the blue, red and green components of the incident white light to separate spaced points in focal plane 302.

Analysis of the diffraction properties of the phase grating structure of the periodic grating 200 defined by equations 1-3 provide evaluations for $d_k$, the respective sawtooth step heights; for distance $t$, the focusing distance of the central wavelength $\lambda_0$, behind periodic grating 200; the lateral displacement S of the position in focal plane 204 of the intensity peak for any wavelength $\lambda$ in the input wavelength spectrum from that of the center wavelength $\lambda_0$; and the lateral width W of the narrow-band intensity peak at $\lambda$ in focal plane 204, as follows:

$$d_k = \frac{\lambda_0}{2(n_2 - n_1)} \left[ \frac{\lambda_0}{\Delta\lambda} + \frac{(m - 2k + 1)}{m} \right]; (1 \leq k \leq m) \quad (5)$$

$$t = \frac{ml^2 n_2}{\lambda_0} \quad (6)$$

$$S \simeq \frac{ml(\lambda_0 - \lambda)}{2\Delta\lambda} \left[ 2 - \frac{\lambda}{\lambda_0} \right] \quad (7)$$

$$W \simeq ml \left[ \frac{1}{m} + \frac{(\lambda - \lambda_0)^2}{(\Delta\lambda)\lambda_0} \right] \quad (8)$$

It should be noted that equation (5) is equivalent to equations (1) and (2), and can therefore be used in their place to select the values of the respective vertical heights $d_1 \ldots d_m$ of the respective in sawtooth steps.

The desired wavelength-dependent near-field focusing properties of the periodic diffraction grating of FIG. 2 defined by equations (5) to (8) follow from the focusing effect of each period of diffraction grating 200 results because each period of diffraction grating 200 has a focusing effect substantially equivalent to that of a parabolic lenslet having a width equal to that of a single period of periodic grating 200 and a depth D which depends on the value of $m$. The focal length of this parabolic lenslet is $t$, shown in FIG. 2 and defined by equation (6). The depth D of this parabolic lenslet is $$D \simeq \frac{\lambda_0 m}{8(n_2 - n_1)} \quad (9)$$

From equation (8), it can be seen that spectral resolution continually improves with increasing values of $m$ (assuming a fixed grating period length $ml$). However, for a value of $\lambda$ near a wavelength limit of the wavelength spectrum (i.e. $\lambda$ near $\lambda_0 \pm \Delta\lambda$), relative improvement diminishes as the value of $m$ approaches or exceeds the value of the ratio $\lambda_0/\Delta\lambda$. This means that in the case of the visible light spectrum, where the value of $\lambda_0$ is about 550 nm and the value of $\Delta\lambda$ is about 150 nm, the value of $m$ need only be about 3 or 4 to provide sufficient resolution between the red, green and blue color components of the light. Thus, in the case of an optical color filter employing the present invention, each period of the filter may include a series of only three or four sawtooth patterns. In fact, if somewhat reduced color saturation can be tolerated, a value of $m$ only equal to 2 can be employed.

Figure 4A:
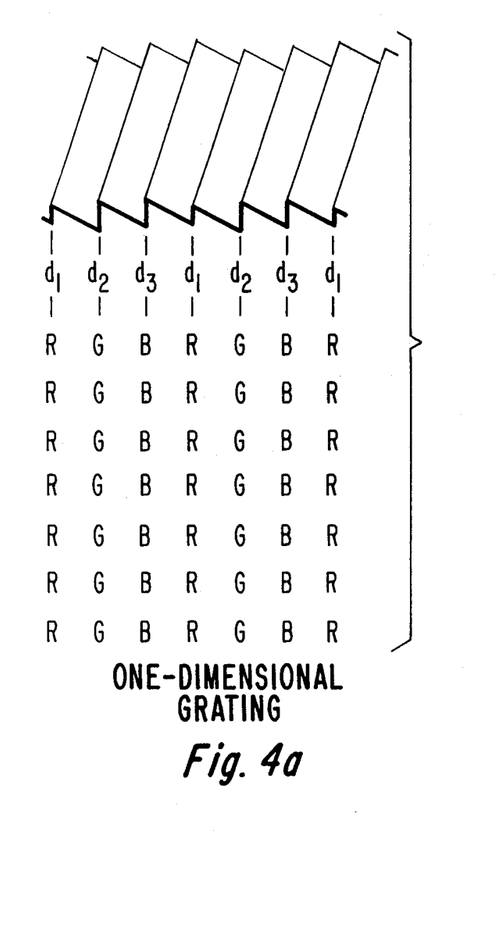
FIGS. 4a and 4b respectively illustrate the operation of a basic one-dimensional grating and a 90° crossed two-dimensional composite grating.
Figure 4B:
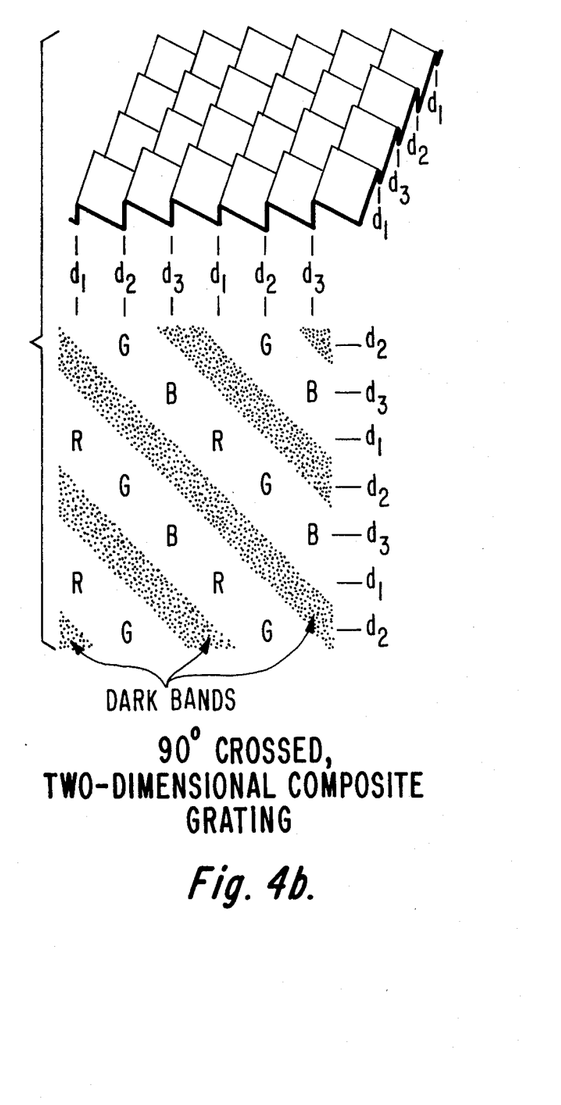

Since increasing the value of $m$ beyond 3 or 4 increases obtainable color saturation of an optical color filter only relatively slowly, it is more desirable to achieve greater color saturation, if desired, by utilizing a two-dimensional composite grating. In particular, FIG. 4a is a schematic showing of the color distribution obtainable from a one-dimensional grating, employing the principles of the present invention, in which the value of m is equal to 3. FIG. 4b is a schematic showing of the color distribution obtainable from a 90° crossed, two-dimensional composite grating, in which each of the two crossed grating components of this composite grating is in itself a one-dimensional grating of the type shown in FIG. 4a. It should be noted that in FIG. 4b, the individual color bands line up diagonally at a 45° angle, with respect to each of the two component gratings of the 90° crossed two-dimensional composite grating, with successive color bands being separated by dark bands. The green (G), blue (B), and red (R) color spots of the 90° crossed-to-dimensional composite grating shown in FIG. 4b are significantly more saturated than the corresponding color spots of the one-dimensional grating shown in FIG. 4a.

With the foregoing as background, some practical applications of an optical color filter incorporating the principles of the present invention will now be discussed. In this discussion, it will be assumed that medium 1 is air having an index of refraction $n_1$ substantially equal to 1; that medium 2 is polyvinyl chloride having an index of refraction $n_2$ substantially equal to 1.5; that 1 is substantially equal to 5 $\mu m$; that $\lambda_0$ is substantially equal to 0.550 $\mu m$; that $\Delta\lambda$ is substantially equal to 0.150 $\mu m$; that $\alpha$ is substantially equal to 22° with the further assumption that m, the number of steps per grating period, is 3 it follows from equation (5) that $d_1$ is substantially equal to 2.39 $\mu m$; that $d_2$ is substantially equal to 2.02 $\mu m$; and that $d_3$ is substantially equal to 1.65 $\mu m$. Further, when m is equal to 3 a "picture element" dimension (i.e. grating period) is substantially 15 $\mu m$ and the focal distance t is in the order of 0.20 mm., as determined by equation (6). Thus, as can be seen from equation (6) if the value of m is reduced to 2, and the values of $d_1$ and $d_2$ chosen in accordance with equation (5), the focal distance t reduces to the order to 0.14 mm., while if the value of m is increased to 4 and the values of $d_1$ to $d_4$ chosen in accordance with equation (5), the focal distance t increases to the order of 0.27 mm.

Figure 5:
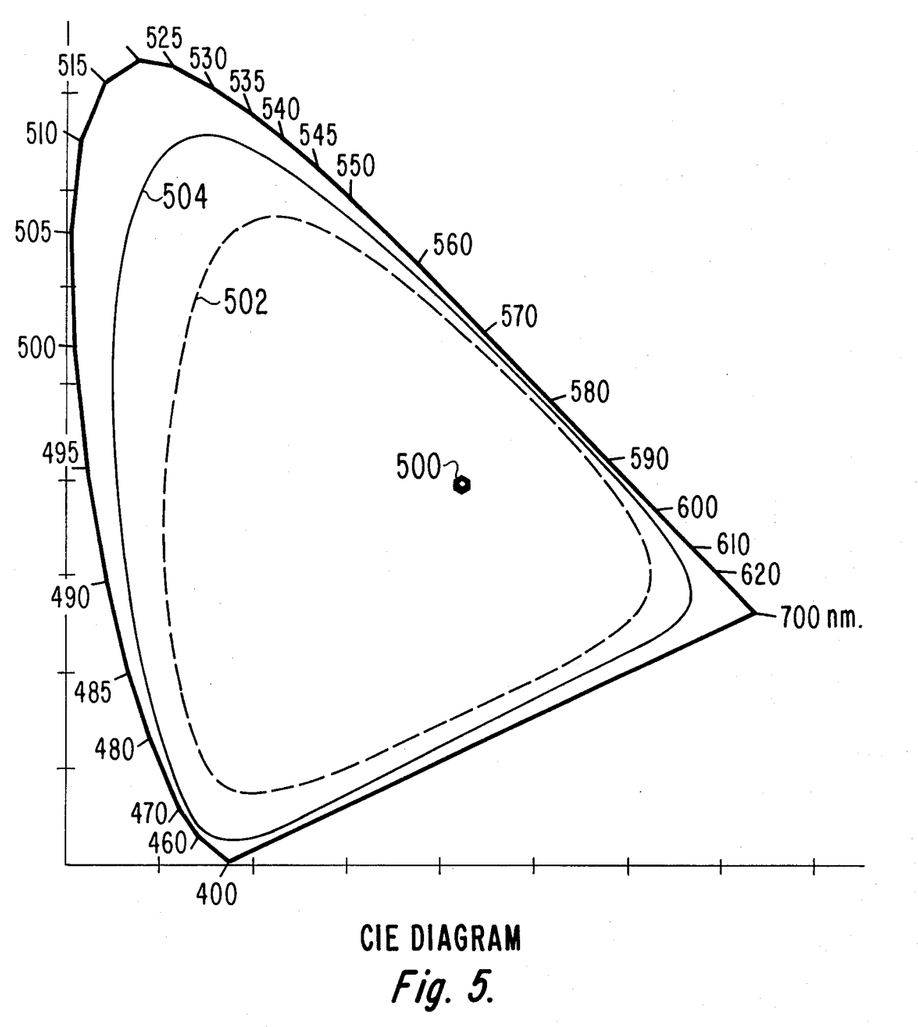
FIG. 5 is a CIE diagram showing the colorimetry obtainable from typical one-dimensional and two-dimensional optical filters employing the present invention.

FIG. 5 is a CIE diagram of colors produced in the focal plane 204, for a white light input 500, where the value of m is 3 and all other values are those set forth above for the assumed example. Curve 502 shows the color spectrum obtainable from a one-dimensional grating of the type shown in FIG. 4a. Curve 504 shows the corresponding color spectrum obtainable from a 90° crossed, two-dimensional grating, of the type shown in FIG. 4b. The color saturation of curve 502, corresponds to a spectral bandwith of about 100 nm, in agreement with equations (7) and (8). This is reduced to a spectral bandwidth of about 70 nm in the case of curve 504. Further, in the case of the 90° crossed two-dimensional grating shown in FIG. 4b, the linear dimension of one color period along the color band is increased from 3 l, i.e. 15 $\mu m$, to $3\sqrt{2}$l i.e. about 21 $\mu m$, while the half-intensity width across the color band is about 0.6 l (i.e. 3 $\mu m$) and the intensity minimum in the dark bands is about three percent.

FIG. 4b shows only one possible example of a useful composite structure of a plurality of angularly displaced one-dimensional periodic gratings which employ the basic structure of the present invention. Other composite structures can be formed by the superposition of two or more of the basic structures at other than 90°, where the basic structures may have identical or different m values, to form, for instance, triangular or hexagonal color patterns in the focal plane.

While optical color filters employing the present invention may be used by themselves for the purpose of spatially segregating the color components of white light, they may also be used in combination with other elements to provide structures having new or improved characteristics.

Figure 6:
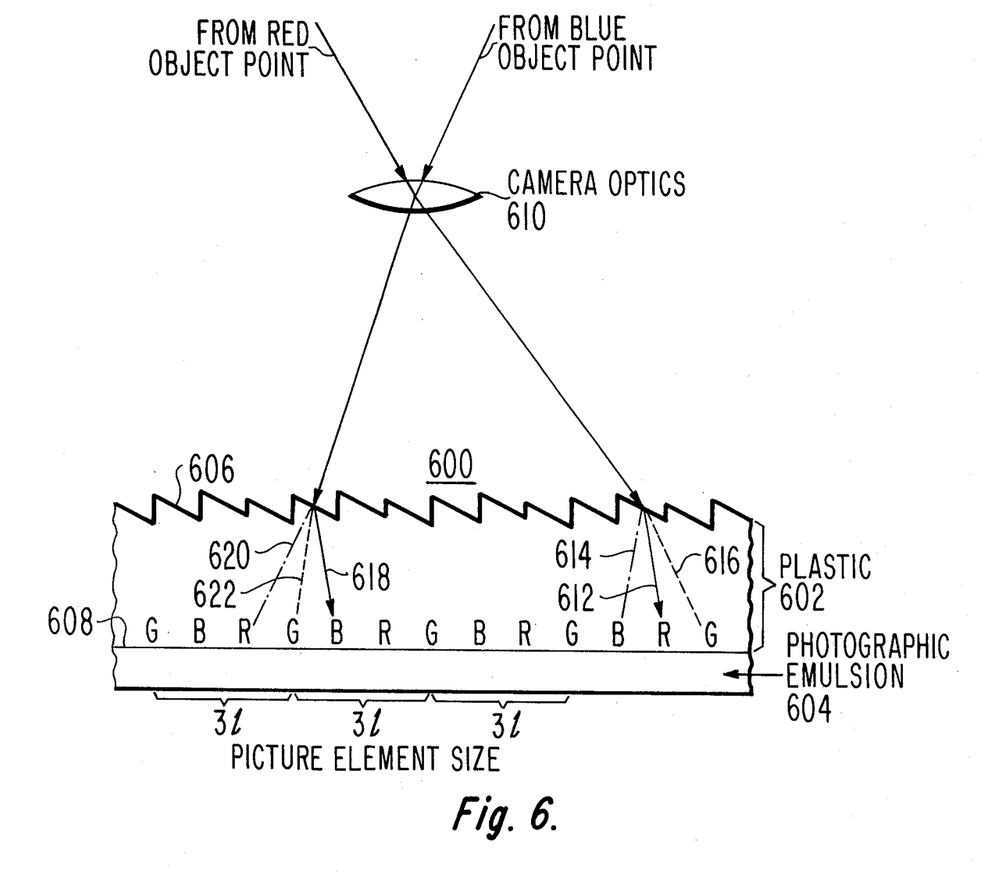
FIG. 6 illustrates a photographic film incorporating an optical phase filter of the present invention which makes it possible to employ black-and-white film to record a color picture.

For instance, by using a plastic embossed with a periodic grating of the type disclosed herein as a "fronting" for a panchromatic black-and-white film emulsion, an improved color photographic process is achieved which permits projection of color pictures from black-and-white positive transparencies. More specifically, as schematically shown in FIG. 6, a panchromatic black-and-white photographic film 600 comprises a transparent plastic "fronting" 602 backed by a suitable photographic emulsion 604. The front surface of plastic 602 is embossed with a periodic grating structure 606 which embodies the principles of the present invention. Grating structure 606 is assumed to have a value of m equal to 3. The thickness of plastic 602 is selected so that the focal plane of the optical phase filter formed by periodic grating structure 606 is situated substantially at the interface between the back surface of plastic 602 and the front surface of photographic emulsion 604. As indicated in FIG. 6, the surface of photographic emulsion 604 is divided into a plurality of contiguous picture elements, each having a size substantially equal to 3l. The area of each picture element is further divided into separate red (R), green (G) and blue (B) regions.

When photographic film 600 is employed in a camera, the camera optics 610 images a picture on the surface of film 600. Each separate picture element in the image corresponds to a separate point in the original object. Camera optics 610 is assumed to be of such design that the light imaged on the surface of film 600 is well collimated. Thus, as indicated in FIG. 6, if the object includes two separated points, one of which is red and the other of which is blue, camera optics 610 will forward the red light from the red object point to a corresponding first picture element of film 600 and forward the blue light from the blue object point to a corresponding second picture element of film 600. However, the effect of the optical phase filter of the present invention results in substantially all the red light being focused to the red region of the first picture element, as indicated by solid lines 612, and substantially none of this red light being focused to the respective blue and green regions of the first picture element, as indicated by dashed lines 614 and 616. On the other hand, substantially all the blue light is focused to the blue region of the second picture element, as indicated by solid line 618, and substantially none of the blue light is focused to the respective red and green regions of the second picture element, as indicated by dashed lines 620 and 622. To get maximum possible saturation of the recorded colors, it is necessary that the light reaching the film from the camera optics is sufficiently well collimated.

If exposed film 600 is developed by reverse development processes, known in the art, to provide a black-and-white positive transparency (i.e., in the developed film 600 regions of picture elements which have been exposed to light are relatively transparent while regions of picture elements which have not been exposed to light are relatively opaque), such a black-and-white positive transparency may be used in a conventional slide projector to display a color picture.

Figure 7:
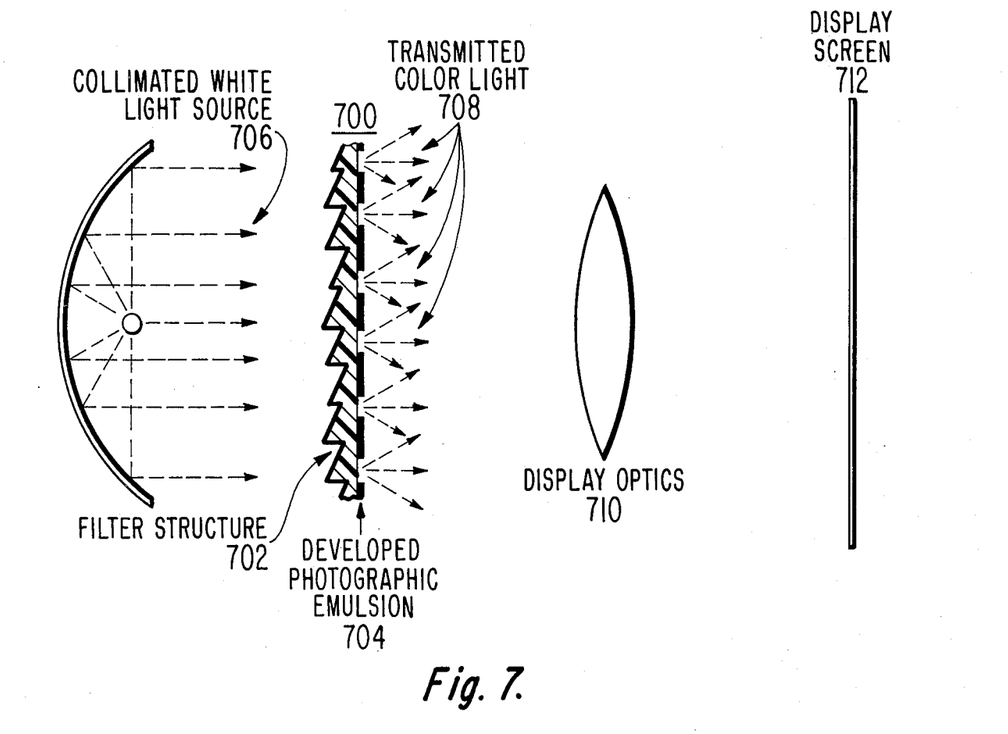
FIG. 7 illustrates a system for displaying in color the color picture recorded on black-and-white film which incorporates an optical phase filter of the present invention.

In particular, as schematically shown in FIG. 7, developed film 700, which has had a picture recorded thereon in the manner described in connection with FIG. 6, still has the same plastic "fronting", incorporating filter structure 702. However, developed photographic emulsion 704 forms a substantially opaque mask covering all regions of the focal plane of filter structure 702 which were not exposed to the light at the time the picture was taken, but leaving the regions which were exposed to light relatively uncovered.

As is further shown in FIG. 7, filter structure 702 is illuminated by collimated white light source 706. Therefore, filter structure 702, in accordance with the principles of the present invention, spatially segregates the input collimated white light into its spectral components, which are focused to separate regions of the focal plane of filter structure 702. However, developed photographic emulsion 704 masks out all portions of the input collimated white light which is focused at those regions of the focal plane of filter structure 702 covered by developed photographic emulsion 704. Therefore, the transmitted light emerging from the transparent portions of developed photographic emulsion 704 manifests in color the picture photographed by the arrangement of FIG. 6. Display optics 710, of a type conventionally employed in slide projectors, may then be employed to project incident color light 708 on a display screen 712 to provide a displayed color picture derived from a black-and-white transparency.

It should be noted in connection with the photographic color picture scheme disclosed in FIGS. 6 and 7, that the plastic optical filter structure and photographic emulsion form a single, unitary, dimensionally-stable integral structure, which is used both to record the picture and to display the picture. Therefore, no problems of alignment or maintenance of registration between the filter structure 702 and developed photographic emulsion 704 ever arises despite the extremely small sizes of the various significant parameters.

Figure 8:
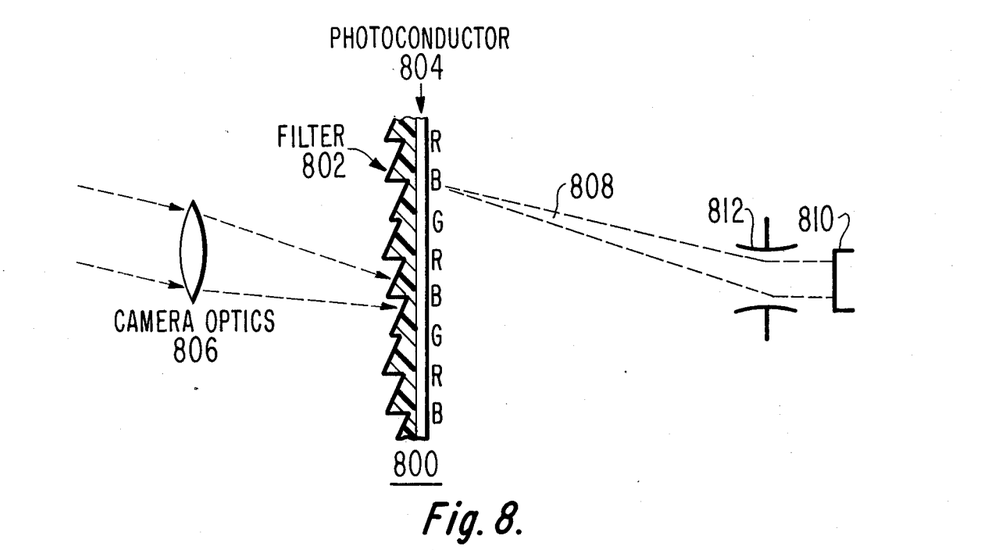
FIG. 8 is a television camera incorporating a photoconductive target which employs an optical phase filter embodying the principles of the present invention.

Another application of the optical phase filter of the present invention is in a color television camera. More specifically, as shown in FIG. 8, a television camera target 800 is composed of an integral structure of optical phase filter 802, embodying the principles of the present invention, backed by a photoconductor sheet 804. The focal plane of filter 802 is in contact with photoconductor sheet 804. This provides means for converting a color picture imaged on target 800 by camera optics 806 into a multiplexed color-information video signal derived by scanning photoconductor 804 with a scanning electron beam 808 produced by electron-emitting cathode 810 and suitable deflection and focusing means 812, in a manner known in the art. In the arrangement shown in FIG. 8, it is preferable that filter 802 employ the 90° crossed structure of FIG. 4b, so that the dark bands between adjacent color bands can be used to generate electrical clock pulses in the output signals, which can be used as an automatic reference for demultiplexing or otherwise identifying the various color components of each picture element, in a manner analogous to that used in striped filters.

Such integrated structures as 700 or 800 employing the optical filter structure of the present invention, may be employed in a manner other than that specifically disclosed in connection with FIGS. 6, 7 and 8. For instance, the transmitted color light 708 manifesting color picture information, emerging from developed photographic emulsion 704 may be directly viewed by eye, with the eye placed approximately in the position of the original recording lens. Thus, display optics 710 and display screen 712 are not essential to viewing a color picture. In addition, collimated white light source 706 can be replaced by a white-light flying spot scanner and the red, green and blue color components of transmitted color light 708 can be picked up by each of three respective photodetectors and displayed on a color cathode ray tube. In the case of FIG. 8, a charge coupled array can be substituted for the electron beam for readout of the color image. Further, integrated structure 800 can be incorporated into a color electrophotograhy system in which a charge pattern initially placed on photoconductor 804 in the dark is selectively transferred to the plastic forming filter 802 in accordance with the exposure thereof, as is known in electrophotography. Here, the transferred charge pattern can be made visible by light absorbing or scattering charged toner particles of sufficiently small size (about 1 $\mu$m.) which can be attracted to the charged locations on the plastic sheet.

Grating structures of the type with which the present invention is concerned may be mass produced by embossing the surface of a plastic, such as polyvinylchloride with a metal stamper made from an original master. An original master of the basic structure of FIGS. 2 and 4a can be fabricated with a ruling machine similar to those used for producing blazed gratings, using a ruling diamond cut an an angle $\alpha$. The ruling depth for each of the $m$ steps is changed in accordance with the desired profile. A metal stamper for embossing plastic can be made by covering the original master with evaporated gold, and then plasting the evaporated gold with sufficient depth of nickel.

Alternately, the original master may be fabricated by exposing a photoresist layer through two similar absorption masks. Each mask may include a single opening of width 1 for each of the respective periods, with the width of each period being $m$l. One mask is placed in contact with the photoresist layer to block light from all but a selected one of the $m$ stripes of each period. Openings in the other mask, which is positioned parallel to and in spaced relationship with the first mask, are focused by suitable optics onto the photoresist through the openings in the first mask. By moving the second mask during exposure at a predetermined fixed rate, the desired linear gradient in exposure of that selected stripe is obtained. The first grating is then moved to select another stripe position and the process is repeated using a different predetermined fixed rate of movement. In this manner, the entire photoresist surface may be exposed. After development, the photoresist shows the desired sawtooth structure of the periodic grating of the present invention. This provides an original master from which a metal stamper can be made in the manner described above.

An alternative method for exposing the photoresist layer would be to substitute photographic film for one or both of the previous masks with a density of film modulated in accordance with the desired sawtooth profile pattern.

By superposition of masks or photographic films at appropriate angles and by simultaneous or successive exposure at these angles, an original master of composite gratings, such as that shown in FIG. 4b, is achieved.

Although all the phase filter structures that have been described herein employ transmissive gratings composed of a material having a higher index of refraction than its surroundings, the phase filters of the present invention may also be implemented by reflective grating structures, rather than transmissive grating structures. For this purpose, a reflecting (e.g. metallic) grating structure shown in FIG. 2a having a profile similar to that shown in FIG. 2 is employed. As shown in FIG. 2a, reflection focal plane 204' is on the same side of reflective grating structure 200' as is incident beam 202 and the focal distance $t$ at point A, due to reflection from a sawtooth step, is inclined an angle $2\alpha$ with a normal to plane 204'. However, the respective values of $d_1 \ldots d_m$ in a reflective grating have to be appropriately scaled down to produce the same optical path difference as in transmission. In accordance with the principles of physical optics, the reasons for this is that (1) any resulting phase differences produced by the phase filter are effectively doubled by the round-trip path traveled in reflection and (2) phase differences in reflection are proportional to the index of refraction of medium 1, while phase differences in transmission are proportional to the relative difference in phase velocity between medium 1 and medium 2 (i.e. proportional to $(n_2 - n_1)$, which difference is normally substantially smaller than the phase velocity of medium 1 itself. Further, in the case of reflection, focal plane 204 becomes a virtual focal plane and the focal distance $t$ is inclined at an angle $2\alpha$ with respect to the normal to the focal plane. Specifically, in reflection, equations (1), (2), (3), (5) and (6) are modified as follows:

$$\delta = -\frac{\lambda_0}{2mn_1} \quad (1')$$

$$\frac{d_1 + d_m}{2} = -\frac{\lambda_0^2}{4\Delta\lambda n_1} \quad (2')$$

$$\tan \alpha = -\frac{\lambda_0^2}{4l\Delta\lambda n_1} \quad (3')$$

$$d_k = -\frac{\lambda_0}{4n_1}\left[\frac{\lambda_0}{\Delta\lambda} + \frac{(m - 2k + 1)}{m}\right]; (1 \leq k \leq m) \quad (5')$$

$$t = -\frac{ml^2 n_1}{\lambda_0} \quad (6')$$

In the embodiment of the invention shown in FIG. 2b, the grating structure comprises sawtooth-varying index of refraction medium 200''. Specifically, within the length 1 of each successive sawtooth-step region of medium 200'' the index of refraction decreases linearly from left-to-right at a predetermined gradient. However, at the junction of each pair of adjacent regions, the index of refraction rises abruptly by $\Delta n_1 \ldots \Delta n_m$, as indicated in FIG. 2b. Respective values of $\Delta n_1 \ldots \Delta n_m$ are proportional to the respective values of $d_1 \ldots d_m$ in FIG. 2.

Although the phase filter structure of the present invention is particularly suitable for use as an optical filter, the filter can be designed to work in other wavelength regimes, e.g. infrared, microwave or millimeter wave etc. provided materials transparent (or reflective) at these wavelengths are used and the dimensions scaled accordingly. Moreover, filters of this type can be used for waves other than electromagnetic (acoustic, ultrasonic, etc.), provided again that materials transmissive (or reflective) to these waves are employed.

What is claimed is:

1. A phase filter for spatially segregating wavelength components of a given wavelength spectrum of an incident substantially plane wave of a given type of wave energy in a near field focal plane of said filter; said phase filter comprising:

at least one diffraction phase grating including a series of a given plural number of different side-by-side regions having respective predetermined shapes and respective predetermined dimensions which produce a unique sawtooth phase delay characteristic from each separate one of said grating regions, said predetermined dimensions of each individual grating region with respect to the center wavelength of said given wavelength spectrum and the difference in wavelength between said center wavelength and either wavelength limit of said given wavelength spectrum having those different respective values that result in said wavelength components being selectively focused by said entire series of regions substantially at differently positioned regions of a near field focal plane of said one diffraction grating in accordance with wavelength.

2. The phase filter defined in claim 1, wherein said one diffraction grating is a reflective diffraction grating.

3. The phase filter defined in claim 1, wherein said one diffraction grating is a transmissive diffraction grating formed by a sawtooth relief pattern on one surface of a material having an index of refraction different from that of its surroundings.

4. The phase filter defined in claim 1, wherein said given type of wave energy is electromagnetic wave energy and said given wavelength spectrum is the visible light spectrum, whereby said phase filter is an optical phase filter capable of spatially segregating applied polychromatic input light into its color components.

5. The phase filter defined in claim 1, wherein said one diffraction grating is a periodic diffraction grating with the periods thereof arranged side-by-side, and wherein each respective period comprises a separate series of said given plural number of different sawtooth grating steps.

6. The phase filter defined in claim 1, comprising a plurality of respective superimposed angularly-displaced periodic surface diffraction gratings, each period of each respective diffraction grating including a series of some given plural number of different sawtooth grating steps each of which has a predetermined shape and predetermined dimensions with respect to the center wavelength of said given wavelength spectrum and the difference in wavelength between said center wavelength and either wavelength limit of said given spectrum that results in said wavelength components being selectively focused substantially at differently positioned regions of a near-field focal plane of that respective diffraction grating in accordance with wavelength.

7. The phase filter defined in claim 6, wherein the given plural number for each period of each respective diffraction grating has the same value.

8. The phase filter defined in claim 6, wherein said plurality of superimposed angularly-displaced diffraction gratings comprises two crossed-diffraction gratings oriented at substantially 90° with respect to each other.

9. The phase filter defined in claim 1, wherein said one diffraction grating is composed of a material which is transmissive to said given spectrum of said given type of wave energy, said diffraction grating forming a boundary between said material and its surroundings, said incident plane wave arriving at said boundary from said surroundings, said surroundings exhibiting an index of refraction $n_1$ and said material exhibiting an index of refraction $n_2$ which is greater than $n_1$, and wherein said predetermined shape and predetermined dimensions are such that said respective sawtooth steps have substantially the same given length dimension $l$ and a different height dimension $d_k$ normal to said length dimension with each of said sawtooth steps being inclined at substantially the same given angle $\alpha$ with respect to said length dimension, and the different values of $d_k$ are selected substantially in accordance with the relationship $$d_k = \frac{\lambda_0}{2(n_2 - n_1)} \left[ \frac{\lambda_0}{\Delta\lambda} + \frac{(m - 2k + 1)}{m} \right],$$

where $\lambda_0$ is the center wavelength of said given spectrum, $\Delta\lambda$ is the difference between said center wavelength and either wavelength limit of said given spectrum, $m$ is said given plural number, $k$ is any integer from $l$ to $m$, and $d_k$ is the height of the $k^{th}$ ordinal sawtooth step in said series, whereby $$\tan \alpha = \frac{\lambda_0^2}{2l\Delta\lambda(n_2 - n_1)}.$$

10. The phase filter defined in claim 9, wherein said surroundings exhibit an index of refraction substantially equal to unity.

11. The phase filter defined in claim 10, wherein said surroundings is air.

12. The phase filter defined in claim 1, wherein said one diffraction grating is composed of a material which is reflective to said given spectrum of said given type of wave energy, said diffraction grating forming a boundary between said material and its surroundings, said incident plane wave arriving at said boundary from said surroundings and after reflection remaining in said surroundings, said surroundings exhibiting an index of refraction $n_1$, and wherein said predetermined shape and predetermined dimensions are such that said respective sawtooth steps have substantially the same given length dimension $l$ and a different height dimension $d_k$ normal to said length dimension with each of said sawtooth steps being inclined at substantially the same given angle $\alpha$ with respect to said length dimension, and the different values of $d_k$ are selected substantially in accordance with the relationship $$d_k = \frac{\lambda_0}{4n_1} \left[ \frac{\lambda_0}{\Delta\lambda} + \frac{(m - 2k + 1)}{m} \right],$$

where $\lambda_0$ is the center wavelength of said given spectrum $\Delta\lambda$ is the difference between said center wavelength and either wavelength limit of said given spectrum, $m$ is said given plural number of sawtooth grating steps included in a period, $k$ is any integer from $l$ to $m$, and $d_k$ is the height of the $k^{th}$ ordinal sawtooth step in said series, whereby $$\tan \alpha = -\frac{\lambda_0^2}{4l\Delta\lambda n_1}.$$

13. The phase filter defined in claim 12, wherein said surroundings exhibit an index of refraction substantially equal to unity.

14. The phase filter defined in claim 13, wherein said surroundings is air.

15. A photosensitive structure comprising:
 a. a sheet of substantially transparent material of a given thickness which exhibits an index of refraction $n$ greater than that of air,
 b. a substantially panchromatic photosensitive medium contacting an area of one surface of said sheet,
 c. at least one predetermined periodic surface diffraction grating embossed on a corresponding area of the opposite surface of said sheet from said area of said one surface thereof,
 d. wherein each period of any one diffraction grating includes a series of a given plural number of different side-by-side sawtooth grating steps all having the same given length dimension $l$ and a different height dimension $d_k$ normal to said length dimension with each of said sawtooth steps being inclined at substantially the same angle $\alpha$ with respect to said length dimension, the different values of $d_k$ being selected substantially in accordance with the relationship $$d_k = \frac{\lambda_0}{2(n - 1)} \left[ \frac{\lambda_0}{\Delta\lambda} + \frac{(m - 2k + 1)}{m} \right], \text{ and}$$

$$\tan \alpha = \frac{\lambda_0^2}{2l\Delta\lambda(n - 1)},$$

where $\lambda_0$ is the center wavelength of the light spectrum to which said medium is sensitive, $\Delta\lambda$ is the difference between said center wavelength and either wavelength limit of said light spectrum, $m$ is said given plural number, $k$ is any integer from $l$ to $m$, and $d_k$ is the height of the $k_{th}$ ordinal sawtooth step, whereby each period of said one periodic diffraction grating forms an optical phase filter capable of selectively focusing the wavelength components polychromatic light incident on that period at differently positioned regions of a near-field focal plane of said one periodic diffraction grating in accordance with wavelength, and
 e. said given thickness of said sheet having a value such that said near-field focal plane substantially coincides with said photosensitive medium.

16. The photosensitive structure defined in claim 15, wherein said photosensitive medium comprises a photoconductor layer in contact with said one surface of said sheet.

17. The photosensitive structure defined in claim 15, wherein said photosensitive medium comprises a photosensitive recording medium.

18. The photosensitive structure defined in claim 15, wherein said photosensitive medium comprises a layer of photographic emulsion in contact with said one surface of said sheet.

19. The photosensitive structure defined in claim 18, wherein said layer of photographic emulsion is unexposed.

20. The photosensitive structure defined in claim 18, wherein said structure has been illuminated by polychromatic light manifesting a color image of a photographed object which is incident on said corresponding area of said opposite surface of said sheet and passes through the thickness of said sheet to expose said layer of photographic emulsion with the selectively focused wavelength components of said polychromatic light at respective regions of said near-field focal plane in accordance with wavelength.

21. The photosensitive structure defined in claim 20, wherein said structure has been reverse-developed to render relatively transparent those regions of said photographic emulsion which have been exposed and to render opaque those regions of said photographic emulsion which have not been exposed.

22. The photosensitive structure defined in claim 15, wherein $\lambda_O$ is substantially 550 nanometers, $\Delta\lambda$ is substantially 150 nanometers, and $m$ has a single value between two and four.

23. The photosensitive structure defined in claim 22, wherein said sheet is composed of polyvinylchloride and has an index of refraction of substantially 1.5.

24. The photosensitive structure defined in claim 22, wherein $m$ has a value equal to three.

25. The photosensitive structure defined in claim 15, wherein said corresponding area of said opposite surface of said sheet has a plurality of respective superimposed angularly-displaced ones of said predetermined periodic surface diffraction gratings embossed therein.

26. The phase filters defined in claim 1, wherein said one diffraction grating is a transmissive diffraction grating formed by a side-by-side arrangement of graded refractive index regions forming a continuous smooth interface with a surrounding medium of constant index of refraction.

* * * * *

UNITED STATES PATENT OFFICE
CERTIFICATE OF CORRECTION

PATENT NO. : 4,079,411
DATED : March 14, 1978
INVENTOR(S) : Rudolf Succo Engelbrecht et al.

It is certified that error appears in the above-identified patent and that said Letters Patent are hereby corrected as shown below:

Column 3, line 14, "width 1" should read --width $\ell$--.
Column 3, line 15, "m1" should read --m$\ell$--.

Column 4, line 51, "m1" should read --m$\ell$--.
Column 5, line 60, "31" should read --3$\ell$--
Column 5, line 61, "3√21" should read --3 $\sqrt{2}\ell$--.
Column 5, line 62, "0.61" should read --0.6$\ell$--.
Column 6, line 32, "31" should read --3$\ell$--.
Column 8, line 41, "width 1" should read --width $\ell$--.
Column 8, line 43, "m1" should read --m$\ell$--.
Column 9, line 50, "length 1" should read --length $\ell$--.
Column 12, line 40, "$k_{th}$" should read --$k^{th}$--.

Signed and Sealed this

Twenty-sixth Day of September 1978

[SEAL]

Attest:

RUTH C. MASON
Attesting Officer

DONALD W. BANNER
Commissioner of Patents and Trademarks